June 12, 1956 P. A. JARAND 2,749,896
COMPRESSION OPERATED FUEL INJECTION PUMP
Filed Aug. 1, 1952

INVENTOR.
PAUL A. JARAND
BY *W. R. Maltby*
*Z. S. Flax*
ATTORNEYS

United States Patent Office 2,749,896
Patented June 12, 1956

2,749,896

COMPRESSION OPERATED FUEL INJECTION PUMP

Paul A. Jarand, United States Navy

Application August 1, 1952, Serial No. 302,285

5 Claims. (Cl. 123—139)

(Granted under Title 35, U. S. Code (1952), sec. 266)

The invention described herein may be manufactured and used by or for the Government of the United States of America for governmental purposes without the payment of any royalties thereon or therefor.

This invention relates to a fuel injection device for internal combustion engines, and in particular to a cylinder having a small piston actuated by a diaphragm with the diaphragm in turn actuated by compression in an engine cylinder and with fuel compressed by the small piston injected through passages extended through the piston into the cylinder of the engine.

The purpose of this invention is to provide a simple mechanical device for injecting fuel under pressure into the combustion chamber of an internal combustion engine whereby the conventional carburetor is eliminated and air alone passes through the intake manifold into the combustion chamber whereupon coming in contact with the fuel so injected combustion takes place along the fuel-air interface.

In the conventional type of internal combustion gasoline engine a fuel-air mixture is drawn into the compression chambers of the cylinders by partial vacuum resulting from downward travel of pistons in cylinders and although the fuel and air may be perfectly mixed it is impossible to get complete chemical combustion. This inherent fault is manifest by the presence of considerable quantities of carbon monoxide, a deadly incompletely burned gas, in the exhaust gases of a properly tuned conventional engine. The incongruous property of a fuel-air mixture that prevents elimination of this problem by simply increasing the supply of mixed air—is that with more air present in a mixed state the mixture refuses to ignite and burn smoothly.

This property of incomplete combustion can be eliminated by direct fuel injection similar to that used in the diesel engine whereby fuel is injected into the compressed air, and ignited, with burning thence progressing along the fuel air interface in manner similar to a torch or burner of a stove. At the point in this fuel air interface where the concentrations are correct, burning will progress, and due to excess air which will be available in an unmixed state will go to chemical completion.

In the conventional diesel engine this is accomplished by a complex system consisting of a high pressure pump, and cam operated injection valves of complex and complicated design, that are difficult to adjust and maintain and expensive to buy and replace.

Therefore this invention contemplates a method of direct fuel injection, simple in mechanical design, needing no external high pressure pumps, cams, ratchets, or other devices as used in conventional diesel injection. It further contemplates a method whereby conventional gasoline engines may be converted to fuel injection with means provided for ignition at the lower compression ratios.

The object of this invention is, therefore, to provide means actuated by the compression of a cylinder for injecting fuel at a greater pressure into the cylinder.

Another object of the invention is to provide an improved fuel injection system whereby the conventional carburetor of an internal combustion engine may be eliminated.

Another object of the invention is to provide a fuel injector, mechanically simple in construction, which will be an improvement over the present complex injectors used in conventional diesel engines.

Another object of the invention is to give positive mechanical control of the rate of fuel flow to each combustion chamber by means of a simple throttle valve at the point of entry of the fuel into the injector. This arrangement is expected to eliminate the influence of pressure waves and hydrostatic pressure which plague the operation of some injection systems. It will further provide means of adjusting the flow of fuel to individual cylinders for purposes of tuning the engine at various speeds.

Another important object of the invention is to provide an improved fuel injection system for internal combustion engines that is adapted to be incorporated in engines now in use, without substantially changing the design or structure of the engine.

A further object of the invention is to provide an improved fuel injection device for internal combustion engines in which the device is of a comparatively simple and economical design.

With these and other objects and advantages in view the invention embodies a housing having a small cylinder therein with a corresponding small piston in the cylinder, with a fuel intake connection having a control valve therein extended from the small cylinder, and with means for mounting the housing in a head of an internal combustion engine and wherein a passage with a check valve therein is provided through the piston from the small cylinder to the compression chamber of the cylinder of the engine.

Other features and advantages of the invention will appear from the following description taken in connection with the drawings, wherein.

Figure 1:
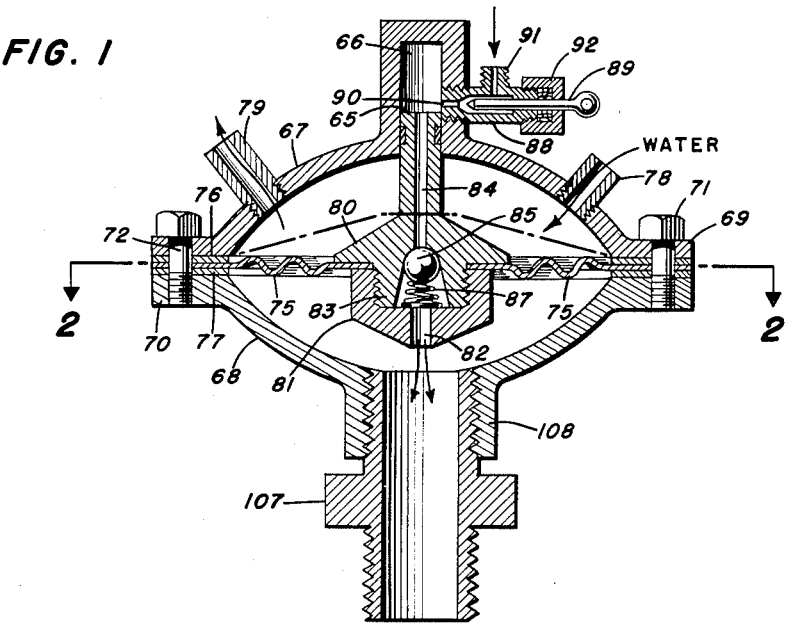
Fig. 1 is a vertical section through a fuel injector wherein the small piston of the device is actuated by a diaphragm and in which a water jacket is provided on one side of the diaphragm to facilitate cooling the device.

Referring now to the drawings wherein like reference characters denote corresponding parts the improved fuel injection system of the invention includes a small piston 65, mounted in a cylinder 66 on an upper section 67 of a diaphragm housing, the upper section 67 being mounted on a lower section 68 with a flange 69 of the upper section and flange 70 of the lower section being secured together by bolts 71 which also pass through openings 72 in a flange 73 of a flexible elastic metal diaphragm 74, the intermediate part of which is provided with concentric corrugations as indicated by the numeral 75. The bolts 71 are threaded into flange 70. Washers 76 and 77 are provided on opposite sides of an annular flange of the diaphragm, as shown.

The upper section 67 is provided with a cooling water inlet connection 78 and a similar outlet connection 79 is provided at the opposite side. By this means water may be circulated through the upper part of the housing to facilitate cooling the elements thereof.

In this embodiment the piston 65 is provided with a base 80 and a nut 81, having an orifice 82 at the center, is threaded on a boss 83, extended from the base 80 of the small piston. The piston 65 is provided with a passage 84 that is aligned with the opening 82 in the member 81 and the base 80 is provided with a cavity in which a spring 87 is mounted and adapted to urge a ball-valve 85 to close the passage 84.

The lower section 68 has a threaded boss 108 which projects from the lower portion thereof and is mounted on a bushing 107.

Fuel is supplied to the cylinder 66 through a control valve body 88, the body 88 being provided with a valve 89 that is adjusted to regulate the size of an orifice 90 extended from the valve body 88 into the cylinder 66. The valve body 88 is provided with a fuel supply nipple 91 and a packing gland 92.

Figure 2:
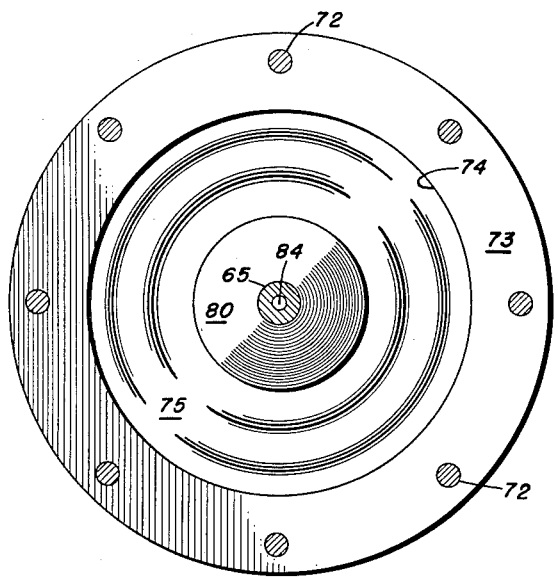
Fig. 2 is a sectional plan taken on line 2—2 of Fig. 1 showing the diaphragm.

The operation of the form as shown in Figs. 1 and 2 is as follows. In applying the invention to the conventional gasoline engine the carburetor is omitted and the injector is mounted on the head or other part of a cylinder with the discharge end of the device opening into the combustion chamber of the cylinder. As the piston in the combustion chamber of the engine moves down, air through the usual intake manifold and intake valve is drawn into the combustion chamber, and with the piston 65 in the position shown in Fig. 1 fuel from supply nipple 91 is drawn into chamber 66 through valve orifice 90 in a quantity determined by the position of control valve 89. This quantity of fuel is trapped in chamber 66 as piston 65 moves upward past orifice 90 and is then forced by the pressure through channel 84, past ball check valve 85 thence through opening 82 into the combustion chamber.

The pressure in chamber 66 is greater than the pressure of the combustion chamber of the engine due to the hydraulic principle wherein two pistons of unequal size acting with the same force on an enclosed liquid or gas will create a pressure inversely proportional to their surface areas. Therefore, the pressure of chamber 66 during operation will be greater than that found in the combustion chamber. The function of the water circulating through the chamber in upper section 67 is to cool the diaphragm and adjacent parts as previously pointed out and in addition the slight amount of pressure present in the water cooling system of the engine functions to aid in the return of the diaphragm to the position shown in Fig. 1.

The valve of each individual injector may be controlled in unison to give throttling, either by a foot accelerator or by lever on the instrument panel.

With this device throttling is controlled entirely by controlling the rate of fuel flow to the combustion chambers. The air consumed by the engine remains fairly constant and is nearly equal to the engine displacement at the lower and moderate speeds.

It will be understood that modifications within the scope of the appended claims may be made in the design and arrangements of the parts without departing from the spirit of the invention.

What is claimed is:

1. A fuel injector comprising a body having a cylinder therein, a fuel supply connection extended from said cylinder, a piston in said cylinder having a base whose area is greater than that of the piston, said body being adapted for mounting on an internal combustion engine with said base positioned to be contacted by gases compressed in the combustion chamber of said engine, said piston having a passage extended longitudinally therethrough, a check valve in said piston positioned to prevent the passage of gases from the combustion chamber of the engine to the fuel supply connection, and a diaphragm mounted in said body and having a supporting connection with said piston base, and coolant connections adapted to supply coolant fluid above the diaphragm to cool said diaphragm and return said diaphragm and piston to a normal position upon release of pressure of the gases of combustion.

2. A fuel injector for internal combustion engines comprising a body having a cylinder therein, a fuel supply means connected to said cylinder, a piston having an enlarged base located in said cylinder, a fuel passage in said piston, a check valve located in the fuel passage, a corrugated diaphragm mounted in said body and connected to the base of said piston, and cooling means adapted to cool the diaphragm.

3. A fuel injector for internal combustion engines comprising a body having a cylinder therein, a fuel supply means connected to said cylinder, a piston having an enlarged base located in said cylinder, a fuel passage in said piston, a check valve located in the fuel passage, a corrugated diaphragm mounted in said body and connected to the base of the piston, coolant connections located on the upper portion of said body adapted to supply a coolant fluid to the upper surface of said diaphragm with said coolant fluid also facilitating the return of the diaphragm to normal position after the firing cycle.

4. A fuel injector comprising a body having a cylinder therein, a fuel supply having a manually adjustable control valve connected to said cylinder, a piston in said cylinder having a base whose area is greater than that of the piston, said body being adapted for mounting on an internal combustion engine with said base positioned to be contacted by gases compressed in the combustion chamber of said engine, said piston having a passage extending longitudinally therethrough, a ball check valve in said piston positioned to prevent the passage of gases from the combustion chamber of the engine to the fuel supply connection, a diaphragm mounted in said body and having a supporting connection with said piston base, and coolant connection adapted to supply coolant fluid above the diaphragm to cool the diaphragm and to return said diaphragm and piston to a normal position upon release of pressure of the gases of combustion.

5. A device as in claim 1 and having a concentrically corrugated diaphragm.

References Cited in the file of this patent

UNITED STATES PATENTS

| 1,146,440 | Nicoll | July 13, 1915 |
| 1,610,997 | Cafferata | Dec. 14, 1926 |
| 1,873,877 | Gernandt | Aug. 23, 1932 |
| 1,999,520 | Stout | Apr. 30, 1935 |
| 2,389,492 | Edwards | Nov. 20, 1945 |
| 2,602,702 | Kovach | July 8, 1952 |

FOREIGN PATENTS

| 187,950 | Great Britain | Nov. 29, 1923 |
| 47,930 | France | Aug. 23, 1937 |
| | (Addition to No. 799,951) | |
| 825,318 | France | Dec. 8, 1937 |
| 132,984 | Australia | June 1, 1949 |